United States Patent [19]

Peterson

[11] Patent Number: 4,574,013

[45] Date of Patent: * Mar. 4, 1986

[54] METHOD FOR DECONTAMINATING SOIL

[75] Inventor: Robert L. Peterson, North Syracuse, N.Y.

[73] Assignee: Galson Research Corporation, East Syracuse, N.Y.

[*] Notice: The portion of the term of this patent subsequent to May 8, 2001 has been disclaimed.

[21] Appl. No.: 724,642

[22] Filed: Apr. 18, 1985

[51] Int. Cl.[4] ............................................. B08B 3/08
[52] U.S. Cl. ........................................ 134/2; 134/25.1
[58] Field of Search ................................ 134/2, 25.1

[56] References Cited

U.S. PATENT DOCUMENTS

| 3,481,991 | 12/1969 | Cohen | 260/623 |
| 4,327,027 | 4/1982 | Howard et al. | 260/340.3 |
| 4,337,368 | 6/1982 | Pytlewski et al. | 568/730 |
| 4,351,718 | 9/1982 | Brunelle | 208/262 |
| 4,400,552 | 8/1983 | Pytlewski et al. | 568/715 |
| 4,421,649 | 12/1983 | Giskehaug et al. | 210/634 |
| 4,447,541 | 5/1984 | Peterson | 435/264 |
| 4,483,716 | 11/1984 | Heller | 134/2 X |

OTHER PUBLICATIONS

Chem. and Engr. News, "New Agent to Destroy PCBs to be Assessed", Oct. 4, 1982, p. 17.

Primary Examiner—Marc L. Caroff
Attorney, Agent, or Firm—Richard D. Multer

[57] ABSTRACT

Halogenated contaminants are removed from soil by reaction schemes which are carried out in a slurry of the soil and a reagent mixture. The latter is made up of an alkaline constituent—an alkali metal hydroxide, an alkali metal hydroxide/alcohol or alkali metal hydroxide/glycol mixture, or an alkoxide—and a sulfoxide catalyst.

21 Claims, 1 Drawing Figure

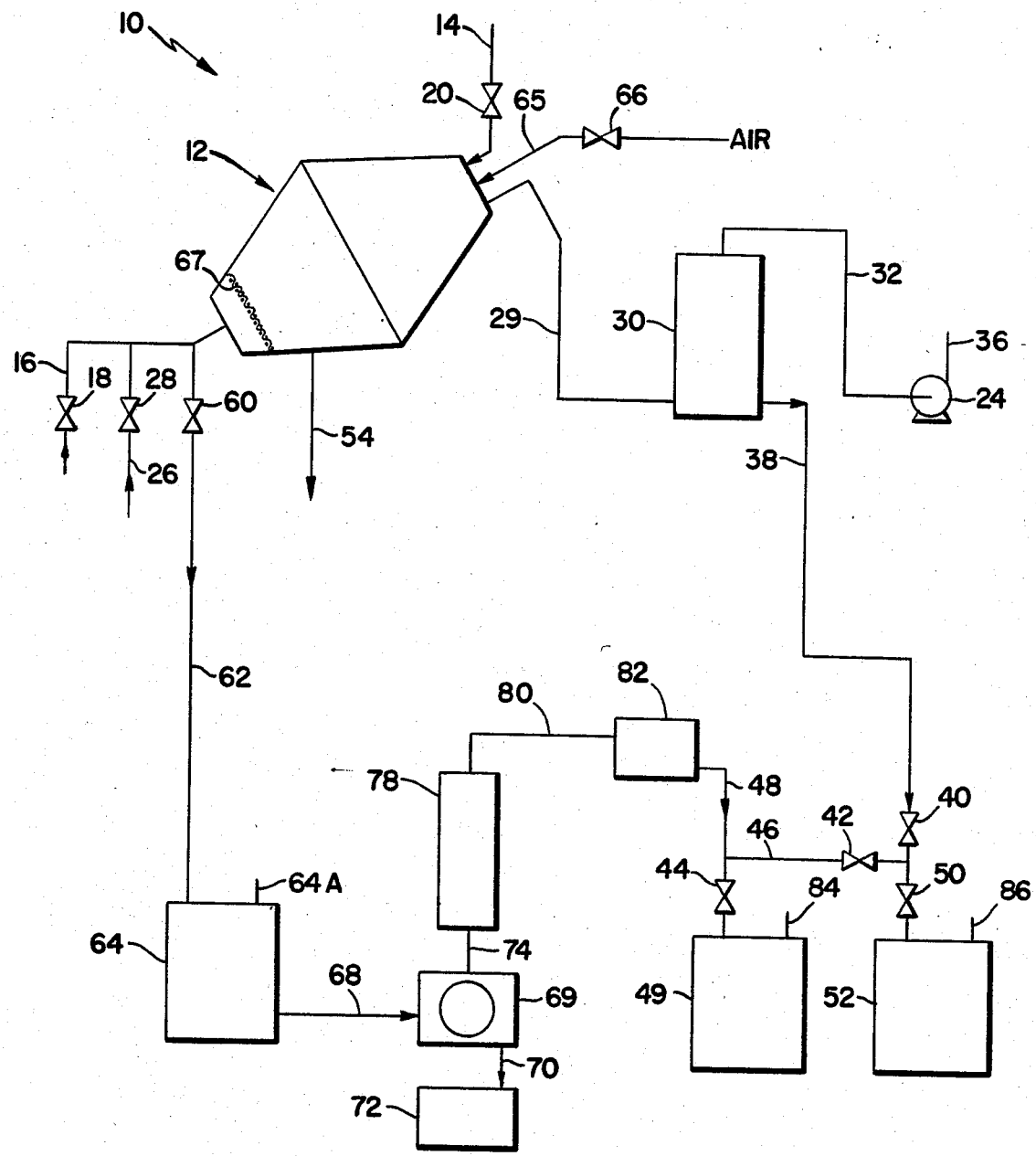

METHOD FOR DECONTAMINATING SOIL

The present invention relates to novel, improved methods for detoxifying soil which is contaminated with a halogenated organic compound.

Soils containing such compounds pose definite hazards to the environment and to public health. Many halogens are toxic to both flora and fauna, physiologically active, and carcinogenic. Halogenated organic compounds also bioaccumulate in the food chain process. Consequently, as an example, a human eating the flesh or drinking the milk of an animal which has fed on plants grown in contaminated soil may ingest the compound to his detriment. Also, such compounds may be leached from the soil in which they are present and enter streams, rivers, lakes, and similar environments where they likewise pose a considerable hazard, see Tabak et al, Biodegradability Studies with Organic Priority Pollutant Compounds, Journal WPCF, Vol. 53, No. 10, October 1981, pp. 1503–1518.

Exemplary of the halogenated compounds which possess dangerous properties such as those just discussed are chlorinated benzenes and phenols, polychlorinated biphenyls and dioxins, other highly chlorinated aromatics such as hexachlorobenzene and polychlorinated phenols, polybrominated biphenyls, and polyhalogenated aliphatics such as carbon tetrachloride and trichloroethylene. In our industrial society halogenated organic compounds are widely used as solvents, heat transfer fluids, and fire retardants and for other purposes in part because of their stability and insolubility in water. These potentially hazardous halogenated compounds have been and continue to be introduced into soil in significant quantities because of improper disposal of banned, spent, and used chemicals; accidental spills; transportation accidents; etc.

Because of their hazardous nature, the existence of halogenated compounds in soil is of considerable concern, especially as their stability and insolubility results in such compounds persisting in hazardous form for virtually indefinite periods of time.

Several methods of disposing of halogenated organic compounds have been proposed. Those known to me are reviewed in my previously issued U.S. Pat. No. 4,447,541 dated May 8, 1984, and entitled METHODS FOR DECONTAMINATING SOIL. That patent also discloses novel methods for converting halogenated organic soil contaminants, typically in situ, to relatively harmless compounds. In those novel processes, a reagent mixture of an alkaline constituent and a sulfoxide catalyst is intimately mixed with the contaminated soil. The reagent mixture effects a desorption of the halogenated contaminant from the soil particles on which it is absorbed and subsequent dehalogenation of the contaminant.

The process disclosed in my issued patent is efficient and has a number of advantages over previously proposed methods for disposing of halogenated organic contaminants. The process, however, does have its drawbacks. One, due primarily to the kinetics involved, is that the time required to reduce the contaminant(s) to an acceptable level ranges from weeks to months. The second drawback of my patented decontamination process is that the amount of reagent mixture required to treat highly absorptive soils can be great enough to raise process costs to a perhaps unattractive level.

I have now invented a new and novel process for ridding soils of halogenated organic contaminants. This process is at least as efficient as that process described in my issued patent. It also has the advantage that decontamination can be effected in days or hours rather than weeks or months or longer and with a substantially lower amount of reagent mixture per given quantity of soil, albeit at a higher capital investment.

In the novel, improved process described herein, the dehalogenation of the contaminants in the soil being treated is effected in a slurry of the soil and an appropriate reagent mixture. It has been found that this approach reduces both the reaction time required to reduce the contaminants to a specified level and the amount of reagent mixture needed to do so to an entirely unexpected extent.

As in the processes described in my issued patent, the reagent mixture employed in those soil decontamination processes disclosed herein is a mixture of an alkaline constituent and a sulfoxide catalyst.

Those alkaline constituents which are useful in my process are the alkali metal hydroxides, mixtures of monohydric and dihydric alcohols and those hydroxides, and alkoxides.

The preferred hydroxide, whether used alone or in admixture with an alcohol, is potassium hydroxide. Of the two readily available (in quantity) and inexpensive alkali metal hydroxides (the other is sodium), it gives much the faster reaction rates. However, sodium hydroxide can also be employed as can lithium, cesium, and rubidium hydroxides. The last three hydroxides, though, are currently too expensive to be practical.

Both mono- and dihydric alcohols can be used in those cases where a hydroxide/alcohol mixture is selected as the alkaline constituent.

Of the monohydric alcohols, benzyl alcohol is preferred because it is an extremely powerful reagent for my purposes, yet has a relatively low molecular weight. Other aromatic alcohols can also be employed as can the higher aliphatic alcohols such as octanol although the latter does not perform as well as benzyl alcohol. Lower aliphatic alcohols-notably methyl alcohol-perform very poorly. Operable dihydric alcohols include ethylene glycol, propylene glycol, and polyethylene glycols (PEG's), particularly those having a molecular weight of 200–600.

Alkoxides, as a class, appear to be operable for my purposes. Preferred because of their activity and commercial availability are potassium tert butoxide and potassium tert pentoxide. These compounds have the drawback of being expensive, however.

Generally speaking, sulfoxides are, as a class, useful as catalysts in the novel processes disclosed herein. Dimethyl sulfoxide (DMSO) is the preferred sulfoxide catalyst. Sulfolane (tetramethylene sulfone) is an example of another sulfoxide catalyst that can be employed.

The proportion of catalyst to alkaline constituent in the reagent mixture is not critical as the activity of the latter is increased in proportion to the amount of catalyst present up to an as yet undefined limit where so much sulfoxide is present in the reaction mixture that it inhibits the requisite contact between the alkaline constituent of the reagent mixture and the polyhalogenated contaminant. Ratios of alkaline constituent to sulfoxide catalyst in the range of 1:4 to 4:1 parts by weight are preferred in most cases for an optimum balance between potentiating effect and cost.

The reagent solution is allowed to react with the halogenated contaminant for a period in the minutes to days range depending on the amount of reagent solution, the reaction rate of the particular halogenated organic involved, the soil temperature, and the degree of reaction required. Typical of the reaction schemes involved in decontaminating soil in the manner disclosed herein is the one which follows:

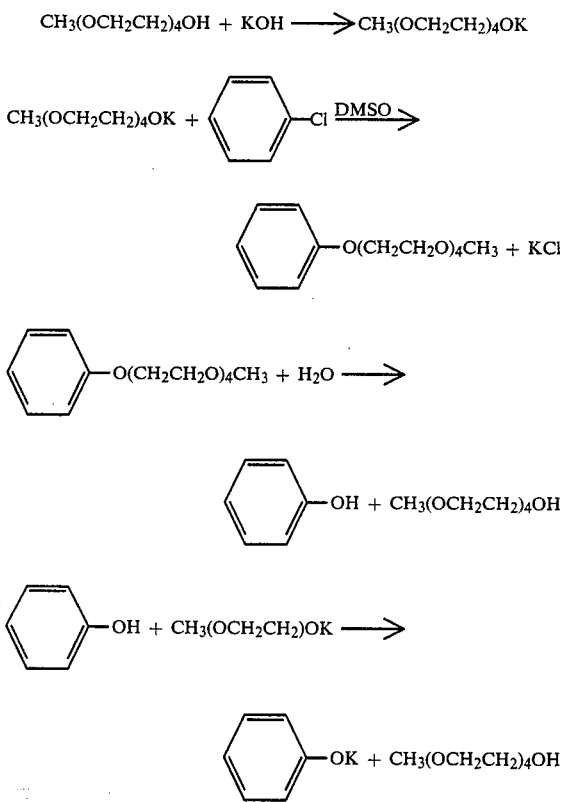

In more general terms, in a typical soil decontamination process as described herein, an alcohol, glycol, polyglycol, or glycol ether reacts with an alkali metal hydroxide to form an alkoxide and water. The alkoxide reacts with an unwanted aromatic halide contaminant to form an ether and a salt. The ether then decomposes to a phenol which reacts with a second mole of alkoxide to form an environmentally acceptable, water soluble phenate.

The mixing of the soil and reagent may be carried out with pressurized streams of reagent, in cement mixers or similar devices, or in any other appropriate manner. Mixing may be either periodic or continuous. The reaction scheme can be carried out at atmospheric pressure at temperatures ranging from 20° C. to 220° C. (higher pressures and temperatures may be used if desired but are generally unnecessary). The reaction may be run in either the presence or absence of air.

When processing wet soil at temperatures above 100° C., the reaction time may be shortened by putting a slight vacuum on the reactor and removing water vapor.

In some cases, it may also be useful to run the reaction under a slight vacuum to prevent possible escape of soil contaminants by volatilization (when the reaction is conducted at room temperature, escape of contaminants by volatilization is not likely to be a problem, due to the low vapor pressure of most aromatic halides).

After the reaction scheme is completed, excess reagent mixture is recovered as by filtration and/or vacuum volatilization. An aqueous wash is also preferably employed to maximize the recovery of reagent from the decontaminated soil and to remove water soluble reaction products from the soil.

The dehalogenated reaction products may be chemically oxidized, biograded, incinerated offsite, or otherwise treated if further treatment is needed to make them environmentally acceptable.

From the foregoing, it will be apparent to the reader that one important and primary object of the present invention resides in novel, improved methods for ridding soil of halogenated organic contaminants.

Other more specific but nevertheless important objects of the invention reside in the provision of methods in accord with the preceding object:

which can be carried out in one or more orders of magnitude less periods of time than heretofore proposed methods for accomplishing the same objective such as those methods described in my above-cited, previously issued U.S. Pat. No. 4,447,541;

which, to eliminate the same amount of the same contaminant or the equivalent thereof, employ a significantly smaller amount of reagent mixture than processes such as those described in my previously issued U.S. Pat. No. 4,447,541;

which, otherwise, have the advantages of the processes described in the aforesaid patent in that they are cost effective, can be carried out at ambient temperature and pressure, and do not involve the handling of dangerous or extremely reactive materials.

Other important objects and features and additional advantages of my invention will be apparent from the foregoing, from the appended claims, and from the ensuing detailed description and discussion of the drawing in which the single FIGURE is a schematic representation of one exemplary system in which halogenated transfer reactions of the type disclosed herein can be carried out.

Referring now to the drawing, the exemplary system 10 illustrated therein includes a reaction vessel such as a rotary mixer 12 in which halogen transfer reactions are effected in a slurry formed in the reactor between contaminated soil introduced through inlet 14 and a liquid reagent mixture compounded as described above and introduced through line 16. Valves 18 in reagent supply line 16 and 20 in soil inlet 14 are then closed to isolate the interior of the reactor from the ambient surrounding.

Various mixer type reaction vessels or reactors may be employed in the practice of my invention. Representative are those described on pages 286–307, Riegel, CHEMICAL PROCESS MACHINERY (2nd edition), Reinhold Publishing Corp., New York, N.Y., 1953. Other types of agitation may equally be employed, the criteria being that an intimate mixture of the contaminated soil and reagent mixture be effected, preferably at the lowest possible cost.

The system 10 in which the reactor is incorporated may be fixed (i.e., stationary), or it may be truck-mounted or otherwise made mobile. The halogen transfer reactions can be carried out at atmospheric pressure. However, it may prove desirable to maintain a subatmospheric pressure in the reaction vessel. This technique can be employed to remove excess moisture from the soils being decontaminated. This reduces the time needed to effect the wanted halogen transfer reactions, bringing about a corresponding reduction in the cost of the decontamination process.

Evacuation of reaction vessel 12 also keeps the halogenated contaminants from escaping into the ambient environment. This is important for self-evident reasons.

Finally, a vacuum in the reaction vessel, by lowering the oxygen content, minimizes oxidative degradation of the glycol or other oxygen-containing, alkaline constituent of the reagent mixture.

In applications where the halogen transfer reactions can advantageously be carried out at sub-atmospheric pressures, a vacuum pump 24 is so operated as to first draw a hard vacuum on the interior of reactor 12 and lower to the maximum extent the oxygen content in the reactor. This minimizes oxidative degradation of glycol and/or other oxygen-containing alkaline constituents of the reagent mixture. Thereafter, the pressure level can be increased to a higher, but still sub-atmospheric, level to improve the economics of the process by removing water from the reactor without allowing the materially less volatile halogenated soil contaminants to escape from the reactor. Economics again dictates the degree of vacuum that will be maintained in reactor 12 after the oxygen therein is evacuated and the halogen transfer reactions are carried out. The degree of vacuum is maintained as low as possible, consistent with the objectives discussed above, to minimize the power needed to, and the consequent cost of, maintaining a vacuum in the reactor.

To ensure that there is intimate contact between the reagent mixture and the soil being treated, an excess (typically large) of the reagent mixture is preferably introduced into reaction vessel 12. Specifically, the amount of contaminant to be removed from the soil will typically be in the parts per million range based on the weight of the soil being treated. In this exemplary circumstance, only a minute ratio of reagent mixture to soil is theoretically needed to effect stoichiometrically complete halogen transfer reactions. However, a weight ratio of reagent mixture to soil ranging from 1.0 part of liquid to 2.0 parts of a nonporous material such as gravel to 0.5 part of a porous soil is preferably employed. This makes it almost certain that there will be the degree of contact between the reagent mixture and the soil being treated needed to have the halogen transfer reactions carried out effectively and in the short periods of time discussed above. I also contemplate, in conjunction with the foregoing, that the reagent mixture be admixed with the contaminated soil in an amount providing at least two moles of alkali metal constituent per mole of halogenated organic compound in said soil.

Upon completion of the halogen transfer reactions, the contents of reactor 12 are typically washed with water introduced through a line 26 containing a valve 28 to remove unreacted reagent mixture and products of the halogen transfer reactions from the now decontaminated soil.

Theretofore, or concurrently, a substantial part of the water and excess reagent mixture are recovered by starting up, or continuing, the operation of vacuum pump 24. These compositions are withdrawn from the reaction vessel through vacuum line 29. The vacuum line is connected through a condenser 30 and condenser outlet line 32 to the vacuum pump to volatilize the foregoing liquids. This also has the advantage of evaporatively cooling the decontaminated soil, thereby facilitating the handling of the latter.

Non-condensibles are vented from the vacuum pump through line 36. Water is the first to condense in condenser 30. The water is circulated from the condenser through return line 38, then open valves 40, 42, and 44, and lines 46 and 48 to wash water recycle tank 49. At that point, a fourth valve 50, interposed in return line 38, is closed to keep the condensed water from flowing into a tank 52 for recycled reagent mixture.

After the water has come off the reaction mass and been condensed, valve 42 is closed, isolating condenser 30 from wash water recycle tank 49; and valve 50 is opened, connecting the condenser through return line 38 to reagent recycle tank 52. Thereafter, components of the reagent mixture coming off in volatile form and reduced to liquids in condenser 30 are returned to reagent recycle tank 52 through return line 38 and then open valves 40 and 50.

As discussed above, the reaction mass in vessel 12 is typically washed to remove therefrom the excess reagent mixture and the products of the halogen transfer reactions before the now decontaminated soil is discharged from the reaction vessel through outlet 54.

At the completion of the wash cycle (typically, 20 to 60 minutes depending upon the efficiency with which the water is mixed into the reaction mass), a theretofore closed valve 60 in a wash water drain line 62 is opened, allowing wash water, reagent mixture, and halogen transfer reaction products to be drained from the reaction vessel into a holding tank 64 equipped with a vent 64a for non-condensible gases. Compressed air is typically introduced into reaction vessel 12 at this juncture through line 65 and valve 66 to strip the wash water or that water and excess reagent mixture from the decontaminated solids. A filtration device such as screen 67 in the lower end of the reaction vessel keeps particulate solids from following the liquids into the drain.

Centrifuging and other conventional techniques can also be employed to effect a separation of the recovered liquids from the decontaminated soil. Techniques such as centrifuging may, however, prove more capital and/or energy intensive than is desirable or necessary in many applications of my invention.

The contents of holding tank 64 are periodically transferred through line 68 to a reboiler 69 in which first water and then the constituents of the reagent mixture are volatilized. Compounds with higher boiling points, principally the products of the halogen transfer reactions, are transferred, still in liquid form, from the reboiler through a line 70 into a still bottom tank 72 from which they can be collected and disposed of in any of several ways exemplified by those discussed above.

The compositions volatilized in reboiler 69 are introduced through inlet line 74 into a conventional distillation column 78. First to come off in the column is water vapor which is transferred through line 80 to condenser 82. The condensed water is discharged from the condenser through line 48 and now open valve 44 into wash water recycle tank 49. Valve 42 is closed in this part of the cycle to isolate the wash water recycle tank from reagent recycle tank 52.

After the wash water has been recovered, valves 40 and 44 are closed and valves 42 and 50 opened, making a flow path from condenser 82 to reagent mixture recycle tank 52. The condensed constituents of the reagent mixture are consequently returned through line 48 to that tank.

In the exemplary embodiment of the invention discussed above, the wash water and reagent recycle tanks 49 and 52 are vented so that any non-condensible gases entrained with the wash water and reagent can escape from those tanks. The vent lines are identified by reference characters 84 and 86, respectively.

The examples which follow show how the novel soil decontamination processes I have invented and illustrated and discussed above can be carried out and further show that the processes in question are totally efficacious. These examples are not intended to describe commercial, full-scale applications of the invention or to limit the scope of the patent protection to which I consider myself entitled.

EXAMPLE I

Fifty grams of a sandy, upper New York State soil and 5 g of a major corporation's transformer oil contaminated with 5000 PCB 1254 (54 wt % Cl) were mixed to give a total concentration of 480 ppm PCB 1254 by weight based on the weight of the soil. The soil/oil mixture was transferred to a three-neck flask fitted with an agitator and mixed with 20 g potassium hydroxide, 10 g Dowanol TMH (a proprietary mixture of methyl capped polyethylene glycols), 10 g polyethylene glycol 400 (PEG 400 is a polyethylene glycol with an average molecular weight of 400) and 20 g dimethyl sulfoxide.

The mixture of contaminated soil and reagent was heated to approximately 180° C. and refluxed under nitrogen for one hour. At the end of the one hour period, the mixture was cooled and the reagent and soil separated by decantation (this technique can obviously be employed in commercial scale processes instead of filtering or centrifuging to effect the above-discussed liquid-solids separation). The soil was then washed with distilled water to remove residual reagent and water soluble PCB reaction products.

The residual PCB concentration in the soil was less than the detection limit of 0.04 ppm PCB, a removal efficiency of >99.99%.

EXAMPLE II

A soil sample as described in Example I was mixed with 1,2,3,4 tetrachloro-p-dibenzodioxin (1,2,3,4 TCCD) to produce a concentration of 30 ppm in 100 g soil. The thus-contaminated soil was mixed with 40 g potassium hydroxide, 20 g Dowanol TMH, and 40 g dimethyl sulfoxide. The soil/reagent mixture was refluxed with agitation in a nitrogen atmosphere for one hour. The soil and reagent were separated by decantation and the soil washed with three volumes of distilled water. The washed soil was then analyzed for 1,2,3,4 TCCD. No dioxin was detected at a detection limit of 0.02 ppm, a removal efficiency of >99.99%. The reader will note that, in the tests reported in the preceding examples, the halogen transfer reactions were carried out in an inert (nitrogen) atmosphere rather than in vacuo or at atmospheric pressure. This was done because that particular approach was more compatible with the scale of the reported processes; the processes described in those examples could equally well have been carried out at sub-atmospheric pressure. Conversely, larger scale processes can be carried out in a nitrogen blanketed or other inert atmosphere although this is not necessary and may be economically disadvantageous.

The invention may be embodied in still other specific forms without departing from the spirit or essential characteristics thereof. The embodiments of the invention disclosed above are therefore to be considered in all respects as illustrative and not restrictive. The scope of the invention is instead indicated by the appended claims, and all changes which come within the meaning and range of equivalency of the claims are intended to be embraced therein.

What is desired and intended to be claimed by Letters Patent of the United States is:

1. A method of decontaminating soil contaminated with a halogenated organic compound, said method including the steps of: forming a slurry of the contaminated soil and a reagent mixture comprising a sulfoxide catalyst and an alkali constituent which is: an alkali metal hydroxide, a mixture of an alkali metal hydroxide and an alcohol, or an alkoxide and maintaining said slurry under temperature and pressure conditions which are effective to promote halogen displacement reactions between said halogenated organic compound and the alkali.

2. A method according to claim 1 in which said slurry is maintained at atmospheric pressure while said halogen displacement reactions are effected.

3. A method according to claim 1 wherein said slurry is maintained at a temperature in the range of 20° to 220° C. while said halogen displacement reactions are effected.

4. A method according to claim 1 wherein the halogen displacement reactions are carried out in vacuo to thereby shorten the time required to effect said halogen displacement reactions and/or to keep volatilized contaminants from escaping into the ambient surroundings.

5. A method according to claim 1 wherein the alkali constituent of the reagent mixture is potassium hydroxide.

6. A method according to claim 1 wherein the alkali constituent of the reagent mixture is a mixture of an alkali metal hydroxide and benzyl alcohol.

7. A method according to claim 6 wherein the alkali metal hydroxide is potassium hydroxide.

8. A method according to claim 1 wherein the alkali constituent of the reagent mixture is a mixture of an alkali metal hydroxide and a polyethylene glycol.

9. A method according to claim 8 wherein the alkali metal hydroxide is potassium hydroxide and the polyethylene glycol has a molecular weight in the range of 200 to 600.

10. A method according to claim 1 wherein the alkali metal constituent of the reagent mixture is an alkoxide and said alkoxide is potassium tert butoxide or potassium tert pentoxide.

11. A method according to claim 1 wherein the sulfoxide catalyst of the reagent mixture is dimethyl sulfoxide.

12. A method according to claim 1 wherein the ratio of alkali constituent to catalyst in said reagent mixture is in the ratio of 1:4 to 4:1 parts by weight.

13. A method according to claim 1 wherein the reagent mixture is admixed with the contaminated soil in an amount providing at least two moles of alkali metal constituent per mole of halogenated organic compound in said soil.

14. A method according to claim 1 which includes the step of agitating said slurry to promote the reactions between the halogenated organic compound and the alkali constituent of the reagent mixture.

15. A method according to claim 1 wherein the halogenated organic compound is a chlorinated benzene or phenol, a polychlorinated biphenyl, a dioxin, hexachlorobenzene, a polybrominated biphenyl, or a polyhalogenated aliphatic.

16. A method according to claim 1 wherein the sulfoxide catalyst of the reagent mixture is tetramethylene sulfone.

17. A method as defined in claim 1 wherein said halogen displacement reactions are carried out in an essentially oxygen-free environment.

18. A method according to claim 1 wherein the ratio of reagent mixture to soil is in the range of 1.0 part of liquid to 0.5 to 2.0 parts of soil.

19. A method according to claim 1 which includes the step of washing the soil with water upon completion of the halogen transfer reactions to remove excess reagent mixture and/or halogen transfer reaction products therefrom.

20. A method according to claim 19 which includes the step of stripping water from said soil upon completion of the step of washing said soil.

21. A method according to claim 1 wherein the alcohol is a dihydric alcohol selected from the group consisting of ethylene glycol and propylene glycol.

* * * * *